No. 646,710. Patented Apr. 3, 1900.
F. A. SEIBERLING.
PNEUMATIC TIRE.
(Application filed Jan. 15, 1900.)
(No Model.)
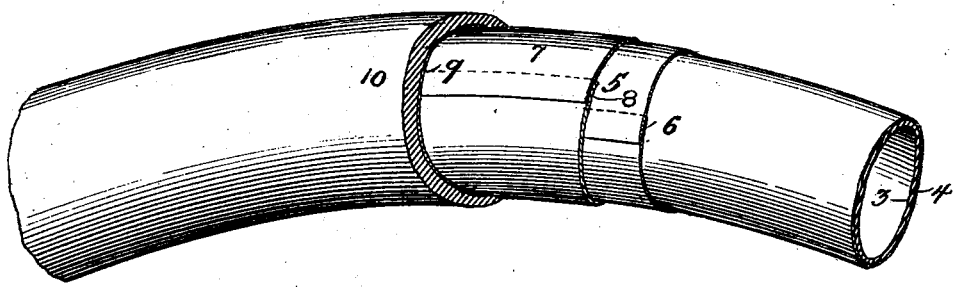
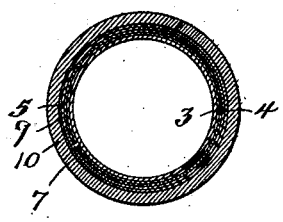

UNITED STATES PATENT OFFICE.

FRANK A. SEIBERLING, OF AKRON, OHIO.

PNEUMATIC TIRE.

SPECIFICATION forming part of Letters Patent No. 646,710, dated April 3, 1900.

Application filed January 15, 1900. Serial No. 1,457. (No model.)

*To all whom it may concern:*

Be it known that I, FRANK A. SEIBERLING, a citizen of the United States, residing at Akron, in the county of Summit and State of Ohio, have invented certain new and useful Improvements in Pneumatic Tires, of which the following is a specification.

My invention is intended to provide a pneumatic tire for vehicles, comprising an inner closed air-tube and an outer sheath or cover.

The object of my invention is to enable a tire of this character to be rapidly and economically made and repaired, and to this end the construction is such that the air-tube and the cover after having their ends telescoped, respectively, may be vulcanized at a single operation without causing the contiguous surfaces of the tube and sheath to adhere, so as to facilitate their separation for repair or renewal.

In carrying out my invention I preferably construct the inner air-tube from a layer of rubber and an exterior layer of fabric, or what is commonly known as "friction-cloth," and the outer sheath or covering from an exterior layer of rubber and an interior layer of friction-cloth or fabric. The tube and sheath when thus constructed and concentrically disposed, however, will unite when vulcanized. To prevent this union or adhesion, therefore, my invention consists in interposing between the inner air-tube and the outer sheath or covering a double layer of cloth, preferably close-woven, which has the effect not only to strengthen the tire, but to permit the complete tire to be vulcanized at a single operation without thereby uniting the two constituent parts or causing them to adhere to each other.

My invention is illustrated in the accompanying drawings, in which—

Figure 1 is a perspective view, partly broken away; and Fig. 2 is a cross-section.

I have not shown the completed tire nor the air-valves, it being understood that a suitable inflating-valve will be applied to the inner air-tube and pass through the outer sheath or covering.

In carrying out the invention I first build up the inner air-tube by employing a layer of rubber 3 and a layer of fabric 4, which may be of ordinary fabric or friction-cloth, such as is commonly used in the manufacture of pneumatic rubber tires. After applying a suitable inflating-valve to the inner air-tube I next form around or draw over said air-tube a strip or tube of plain cloth 5, which may be ordinary muslin, but preferably of a close texture. A convenient method of doing this is to simply fold a strip of cloth around the air-tube while in place on the rod or mandrel, the edges being preferably glued or caused to adhere, as shown at 6. Over this strip or tube 5 I then fold a second strip or tube 7 of the same material, the same having its edges similarly glued or caused to adhere, as shown at 8. Over this jacketed air-tube I then build up the outer sheath or covering, employing therefor first a strip of fabric 9, wrapped thereon, and then a layer of rubber 10, which may be thickest at the tread portion of the tire. After the two tubes are thus composed their ends may be telescoped and the tire vulcanized at a single operation. By this means the inner air-tube will have its constituent layers of rubber and friction-cloth vulcanized, so as to constitute a single homogeneous structure, and the outer sheath or covering will also have its parts vulcanized together. By reason of the interposition of the jackets or envelops 5 and 7 of plain cloth the adjacent surfaces of the air-tube and sheath will not be united by vulcanization, but will remain entirely separate and distinct from each other, so that the two may be readily separated for repair or renewal. While the interposed envelops or jackets of plain cloth will prevent this union or adhesion, they will at the same time afford material strength to the tire, preventing rupture of the inner air-tube under pressure and at the same time affording surfaces to contact with both the inner air-tube and the outer sheath or covering which will effectually prevent the creeping of the parts with reference to each other in use.

While I have described and prefer to use two envelops or jackets composed of plain cloth, it may be found sufficient to use in place of these a single envelop or jacket of some other material, such as cloth impregnated with some non-uniting compound, or even to use a single sheet of paper, wood fiber, or other material, it being necessary only that such single sheet be of a material that will not adhere during vulcanization.

I have found in practice, when machinery is employed in constructing these tires, that the most practical way of applying the strips or tubes 5 and 7 is to form them of a single strip of fabric wound twice around the air-tube 3, the result being that when the parts are vulcanized the inner layer of said fabric will unite with the layer of fabric 4 on the air-tube, while the outer layer of said fabric will unite with the layer of fabric 9 on the inner side of the sheath 10, the result being that the two layers of said fabric will be separate and not united, as will be the case when two separate sheets 5 and 7 are employed. Now when it is desired to separate the two tubes the outer tube or sheath 10 may be cut along a line coinciding with the point of juncture of said inner and outer layers, the cut extending through said point of juncture, whereby the two layers of fabric will be separated.

I wish it to be distinctly understood that while I have shown and described the separating medium as interposed between the two layers of fabric or friction-cloth 4 and 9 I do not limit myself to such construction, as said separating medium may, if desired, be interposed between the air-tube 3 and the fabric or friction-cloth 4, thus bringing the two fabrics or friction-cloths 4 and 9 into immediate contact.

I claim—

1. A pneumatic tire consisting of an inner air-tube of rubber, an outer covering of rubber, and an intermediate layer or layers of fabric adapted to adhere by vulcanization, in combination with a double layer of material inclosing the inner air-tube and inclosed by the outer covering of rubber and not united together by vulcanization, substantially as described.

2. A pneumatic tire consisting of an inner air-tube of rubber with an outer adhering layer of fabric and a sheath having an outer layer of rubber and an inner adhering layer of fabric, and a tubular jacket or envelop consisting of a double layer of material inclosing the inner air-tube and inclosed by the outer sheath or covering, composed of a non-uniting material, substantially as described.

3. A pneumatic tire composed of two separate, endless tubes of vulcanizable material, and an intermediate non-metallic tubular envelop inclosing the inner tube and having frictional contact with both inner and outer tubes, and composed of a material which will not unite with the contacting surfaces of the tubes during the process of vulcanization, substantially as described.

FRANK A. SEIBERLING.

Witnesses:
M. B. COLE,
PERCY B. HILLS.